United States Patent [19]

Domnick

[11] 3,708,965

[45] Jan. 9, 1973

[54] GAS FILTERS

[76] Inventor: Keith Raphael Domnick, East Boldon, County Durham, England

[22] Filed: Sept. 8, 1970

[21] Appl. No.: 70,246

[52] U.S. Cl. ..................55/488, 55/498, 55/514, 55/527, 210/315, 210/489, 210/494
[51] Int. Cl. .................................................B01d 27/00
[58] Field of Search................55/183–187, 485–489, 55/498, 500, 504, 505, 514, 510, 527, 528; 210/485, 484, 488–491, 499, 315, 494

[56] References Cited

UNITED STATES PATENTS

| | | | |
|---|---|---|---|
| 2,413,769 | 1/1947 | Kasten | 55/486 |
| 3,026,609 | 3/1962 | Bryan | 55/527 |
| 3,208,205 | 9/1965 | Harms et al. | 55/487 |
| 3,252,270 | 5/1966 | Pall et al. | 55/486 |
| 3,295,680 | 1/1967 | Wilber | 210/315 |
| 3,460,680 | 8/1969 | Dimnick | 55/485 |
| 3,505,794 | 4/1970 | Nutter et al. | 55/498 |
| 3,527,027 | 9/1970 | Knight et al. | 55/487 |

*Primary Examiner*—Bernard Nozick
*Attorney*—Otto John Munz

[57] ABSTRACT

A gas filter is provided for the removal of extremely finely divided aerosols and water including particles in the range of 0.01 to 0.8 microns in size and especially oil in compressed air; the liquid is coalesced in a filter medium of non-absorbent fiber and collected from a sleeve carried downstream of the filter medium which is held compressed between inner and outer fluid permeable support members the ends of which are sealed to the juxtaposed edge regions of the filter medium.

2 Claims, 8 Drawing Figures

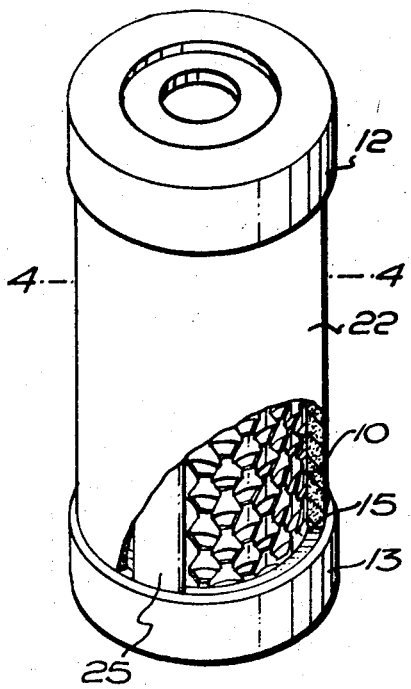
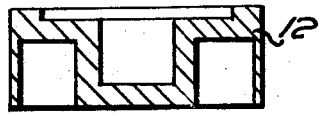
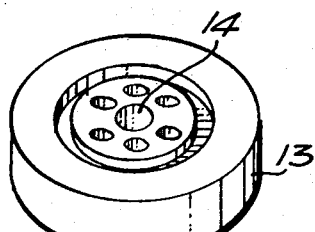
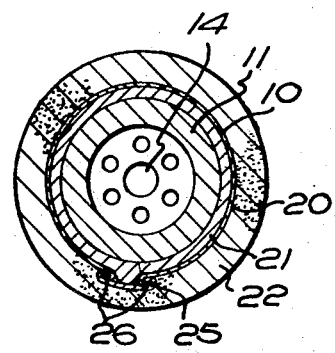
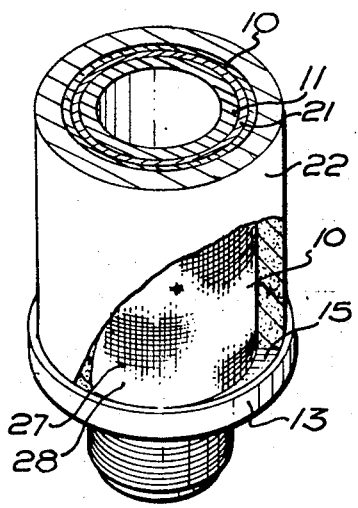
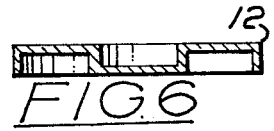
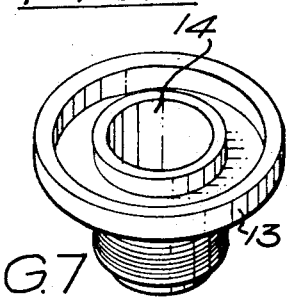
INVENTOR
KEITH RAPHAEL DOMNICK
ATTORNEY

GAS FILTERS

This invention concerns improvements in and relating to filters for gases and especially but not exclusively for the removal of oil carried over from oil lubricated air compressors.

Oil is harmful to some equipment at anytime, but good oil in pneumatic systems can be helpful in reducing maintenance of some types of equipment such as pneumatically operated power tools. With other types of equipment, any oil *at all* will be a source of instrument malfunction and produce contamination or costly machine down time.

The oil that gets into the air is usually a petroleum product, leaves a sulphur residue and, being a hydrocarbon it leaves a hydrogen residue on metal surfaces. When water condensing from the air is added, the result is weak solutions of sulphuric and hydrochloric acid. Such acid can soften 'O' rings and other seals, and corrode many metals. The combination of oil and water heated by an oil lubricated compressor forms an emulsion and converts this into varnish. When such varnish coats surfaces in a rotating or reciprocating pneumatic device, it gradually slows down its operation. Sometimes the varnish veneer builds up so much that the tool eventually seizes up and stops.

Another source of oil contamination of compressed air is the pipe lines themselves. Air line lubricators are usually installed on most pneumatic systems, and sometimes air is caused to reverse in them. When this happens, the oil mist entrained in the air is also drawn in reverse flow. For instance in the common case where air is used in a vertical pipe line taken off a main air line upstream of a lubricator and another vertical pipe line is located downstream of the lubricator, closing off the other pipe line causes the oiled air to reverse in flow and contaminate the pipe line before the lubricator.

Another source of hydrocarbons in an air system is pneumatic equipment itself. Directional control air valves, cylinders, shut-off valves, regulators and other such equipment are often manufactured with grease or oil packed into or wiped onto them.

It is an object of the invention to provide an improved filter medium and filter media support for the removal of oil and moisture particles and extremely fine oil droplets including those having dimensions in the range of from 0.01 to 0.8 microns.

Oil can be found in three forms in compressed air systems-liquid, aerosol and gas. The first two are the most troublesome and of these liquid oil is removed more readily. Since oil gas is not intolerable and since liquid oil can easily be removed, it is necessary to have filters capable of removing the objectionable aerosol.

The liquid droplets of oil aerosol can be as small as 0.01 microns in size and will account for about 99 percent of the oil present. Since normal filters will not trap particles of such a small size, they are useless for the removal of oil aerosol.

Breakdown of compressor lubricant contributes almost of the aerosol, as well as carbonmonoxide, aldehydes, oxides of nitrogen sulphur oxides, and even some water vapor. Oil aerosol is created by the churning of the crankshaft of the compressor in its crank case oil bath and an oil mist is deliberately created to lubricate cylinder walls and piston rings. Mechanical shearing of the lubricating oil film on cylinder walls also contributes to the introduction of minute aerosol particles in the air being delivered by the compressor. High sheer rates, close tolerances and high temperatures combined, produce large volumes of finely divided oil mist.

Lubricants containing less sulphur than normal and having a flashpoint higher than 800°F, such as synthetic lubricants of the phosphate ester type, do not 'crack' in a hot compressor cylinder as do ordinary oils. Hydrocarbon gases such as methane, ethane and butane are produced from oil by cracking and present a problem when air is being used for gas chromatography and hydrocarbon analysis. If the oil aerosol is not removed it will collect at orifices, pressure regulators, nozzles, gauges and the like constrictions where the high air turbulence causes oil impingement and coagulation.

A further object of the invention is to coalesce the fine oil aerosol so as to produce a bulk liquid and to provide means for collecting the liquid and preventing its re-entrainment in the air.

Another object of the invention is to provide filters for cleaning air used in food operations at improved ranges of purity.

Air used in the food industry must not have a contaminant content greater than 0.15 percent of mineral oil, expressed as a percentage by weight of the product. For example if a bakery handles 3000 lbs of baked product per hour with air in contact with those products, 1.2 ozs of oil per minute could be tolerated. An average compressor operating at 100 – 110 psig, yields 1 oz of oil per 60,000 – 100,000 cu. ft. with a 300 scfm usage of air to process the food, the total oil passed into operation would be 0.005 ozs per minute. This would be well below the tolerable rate. In food operations the oil that is acceptable is a UF-P17 for readily carbonable systems. It is further defined, and must meet the specifications in the Journal of the Association of Official Agricultural Chemist, volume 45, page 66, 1962 publication. In the majority of cases it is thought to be desirable that all oil be removed.

The vapor pressure at a certain temperature of oil or moisture determines the volume at which they can be present as a gas in compressed air. The vapor pressure of water is 300,000 times higher than the vapor pressure of a compressor lubricant when converted to gaseous form. The amount of oil that can be in a gaseous state in compressed air is only about 0.000001 percent of the air's volume, or 0.01 p.p.m. This small amount does not condense readily, it is water vapor or oil droplets that are the real sources of trouble. Oil vapor in most cases has an objectionable odor but this need only be removed in certain instances where for instance air is being used for breathing apparatus or where the odor would taint a foodstuff being processed.

It is also an object of the invention to remove moisture together with oil.

Water is always present in compressed air, but not always evident. Up to 5 percent – 6 percent of the ambient air is made up of water vapor, depending upon the temperature and humidity on any given day. When compressed, the air contains correspondingly higher concentrations of this water.

Water by itself is not always as harmful to a pneumatic device if oil and dirt are removed as it would be in their presence. However, it will cause freezing in some climates or cause rust and scale to form in pipe lines, wash out lubricants, and soak leather packing and fiber gaskets. It also causes many pneumatic instruments to give incorrect signals or readings gives rise to blisters in paint and is undesirable in handling systems for purlvenulant materials particularly due to caking of material such as sand and cement.

By the removal of contamination, up to 99.999 percent of all sub-micronic gas entrained liquid and solid particles, filters according to the invention are of value when used upstream of dessicant type air dryers, which dry air in the sense of lowering its dewpoint, by extending their moisture removing life and efficiency.

Compressed air is also used extensively for pneumatic instruments and spray painting guns, and these require the type of oil free air produced by our new filter. Other useful applications are purifying welding gases, air for air bearings, air used for blow moulding plastics, the production and packaging of:- Antibiotics, vaccines, foodstuffs, milk, pure culture yeast, beer, liquid sugar, electronic components, photographic material and fine chemicals. It also improves the performance of pneumatic measuring and gauging tools, printing and paper separation, fluidic devices, vacuum pumps and gas burners.

According to the invention a filter for gases comprises inner and outer fluid permeable support members, the inner support member being located within the outer fluid permeable support member and being apertured for communication with a conduit, a first one of said support members being constructed to permit it to move towards said other support member, a filter medium body of non-absorbent fibers disposed between said support members, the distribution and dimensions of said non-absorbent fibers being adapted for contact by and complete removal from gases of liquid droplets having dimensions of the order of 0.01 microns said fibers being free of adhesive material and being compressed by said inner and outer support members, at least one of which itself has a porosity sufficiently small to prevent movement or migration of said fibers upon shock pressure loading by the gas, the filter medium body being bounded by operational surfaces and having edge regions juxtaposed between said support members, a fluid impervious sealant penetrating said edge regions of the filter medium body and forming a bond between them and the juxtaposed support members, compression means being provided for maintaining the position of one said support member relative to the other for maintaining compression on the operational surfaces of the filter medium body and a porous sock covering the support member from which filtered gas issues, at least the support member from which gas issued having bounding the filter medium body, a boundary filter layer of porosity sufficiently small to prevent rupture upon shock loading in use.

The filter is undirectional and usually gas is passed in through the conduit and outwardly through the filter medium body to the porous outer sock covering said outer support member. The inner support member generally has no pores of greater dimensions than 400 microns and usually the pores are less than 300 microns and not less than from 50–150 microns. The sock receives liquid coalesced by the non-absorbent fibers of the filter medium body and a sump may be provided in housing for collecting the liquids as it drains down and drops from the sock.

Both support members may themselves be microporous, for example of woven wire such as stainless steel, sintered metal such as sintered stainless steel or sintered bronze, of microporous plastics material such as phenolic resin or of reinforced filter material such as plastics impregnated paper or a wound ribbon element. In any case it is important that the inner face, i.e. the face bounding the filter medium body, of the support member from which filtered gas issues presents a microporous boundary layer to the operational surface of the non-absorbent fibers of the filter medium body in order that fiber migration does not take place with consequent channelling in the filter medium body and possible rupture for example upon shock pressure loading by the gas as when an air line is opened at a pressure in excess of 100 psi. Operative pores of the microporous boundary layer of the support member can have dimensions in the range of from 25 to 150 microns but normally in the range of from 50 to 75 microns for permitting passage of gas at elevated pressure without rupture of the filter medium body.

The boundary layer may be provided by a filter cloth and the associated support member employed may then, as may the support member to which contaminated gas is supplied, be more coarsly perforated for example perforated plastics material or expanded sheet metal such as 26 gauge stainless steel, brass or cadmium plated mild steel, or a wound ribbon element. In the case of expanded sheet material employed as a support member the distance between the furthest apart pair of apices of the rhomboidal perforations was one eighth of an inch and the distance between the nearest pair of apices half this amount, the perforation area being 43 percent of the final support area.

The support members may be truncated cones or elongated hollow members of angular, e.g. square, section but are usually concentric cylinders.

The filter medium body consists of non-absorbent fibers, i.e. fibers or chopped filaments having a low moisture regain usually less than 1.5 percent and preferably glass, e.g. borosilicate, fiber. The fiber must be very fine but it is not necessary that the majority of the fibers are of the same order of size as the droplets which coalesc on them. The fiber diameters fall mainly in the range of from 0.08 to 0.5 microns and usually not less than 40 percent of the fibers by weight have diameters in the range of from 0.09 to 0.2 microns, some 2 percent being in the range of from 0.04 to 0.09 microns.

The support members are clamped over the filter medium body, for example by a sliding fastener or by cementing, for instance with epoxy resin jointing compound especially in the case where the outer support member is of woven wire. The support member ends are connected to the compressed filter medium body by a sealant such as epoxy resin or silicone rubber. The epoxy resin may be cold curable and should have a viscosity of about 14 poises so as to avoid the filter medium body drawing up the resin. End caps of the same material may be formed integrally with the sealant, one of the end caps being provided with a conduit e.g. by attachment to a screw threaded cap insert.

Usually sealant is poured into end caps, the support member ends are end regions of the filter medium body are submerged in the sealant which is then cured.

In the preferred embodiment of the present invention, the filter represents an improvement over applicant's earlier U.S. Pat. No. 3,460,680. In the present invention, applicant has determined that in conjunction with the compression exerted on the filter medium that it is not necessary for the boundary layers to be separate and distinct elements of the filter combination, but that it is operationally more efficient for the boundary layers to be structurally part of the fluid permeable support members. Further, applicant has determined that is essential only to provide a boundary layer on the side of the filter medium from which the gas issues in use.

The characteristics of contamination found in compressed air may be classified in the following manner:
 a. Hydrocarbon gases of lower molecular weight (methane and ethane for example) and moisture vapor.
 b. Oil and moisture particles that condense out of the air at low temperatures.
 c. Extremely fine oil droplets are formed the most troublesome being in the 0.01 – 0.8 micron range.

When it is necessary to remove the moisture vapor mentioned in (a), silica gel, molecular sieve or a refrigerated air dryer can be used. In cases where lower molecular weight hydrocarbon gases must be removed, a gaseous oil removing molecular sieve is preferable. The filtration/separation process presented in our new filters will remove both types of contaminants listed in (b) and (c).

Tests have shown that the only effective method of removing the impurities mentioned in the above groups (b) and (c) is by use of a fibrous bed. With the correct size of fiber and correct depth of bed, direct interception, inertia impaction and diffusion each play their part in trapping liquid droplets and converting them into bulk liquid. The fibers in the bed are at right angles to the air flow.

Direct interception occurs when a droplet collides head on with one of the fibers and spreads over the surface of that fiber and those adjacent to it.

Inertia impaction results if a droplet in the air stream fails to negotiate the tortuous path presented by the random fibers in the filter bed, collides with one or more fibers and spreads as described above.

Diffusion — Extremely small particles wander in Brownian motion within the flow pattern of the air stream so enhancing their chances of colliding with each other and with fibers within the bed.

In a preferred embodiment the filter medium body is cylindrical and air flow is from inside to out. The filter is reinforced as already described completely to eliminate fiber migration and the ends are encapsulated to prevent bypass at that point. The porous plastic sock fitted externally to the element prevents re-entrainment of liquid separated from the air. The outer porous sock absorbs the coalesced bulk liquid but because of its extremely high surface area cannot become saturated, the oil gravitates down within the open pore structure of the outer sock of porous material such as foam polyurethane or rubber or expanded synthetic rubber, eventually dropping off into the sump of the housing containing the filter element. Because the air flow for the filter is unidirectional it is not in every case necessary to employ a boundary layer of woven fabric between an inner cylinder and the filter media.

In this new filter the contaminated air enters the inside of the element and larger dirt particles are screened out on an inner core. Then the heterogeneous mixture in the air flows through the labyrinth of micro fibers during which 99.999 percent submicron particles of dirt are trapped and water and oil aerosols are coalesced. As this contaminant laden air flows through the fibrous cylinder not only does direct interception take place but also because of the element's uniformly high density, fiber distribution and depth, inertia impaction and diffusion are used to best possible advantage in trapping the contaminants and converting mists to liquid by coalescence. Then as previously described the outer porous plastic sock does its essential job of preventing re-entrainment of the coalesced oil and water.

The invention will now be described further, by way of example, with reference to the accompanying drawings in which:

FIG. 1 shows a filter according to the invention having an outer support member of expanded metal clamped by a slide fastener and with an outer porous sock partly removed for clarity, FIG. 2 is a cross section through the upper end cap of the filter, FIG. 3 shows the lower end cap of the filter of FIG. 1, FIG. 4 is a cross section along the line 4—4 of FIG. 1, FIG. 5 shows a further filter according to the invention partly in section having an outer support member of woven stainless steel wire, FIG. 6 is a cross section through an upper end cap of the filter of FIG. 4

FIG. 7 shows the lower end cap of the filter of FIG. 4 and

In the drawings like reference numerals denote like parts.

Figure 8:
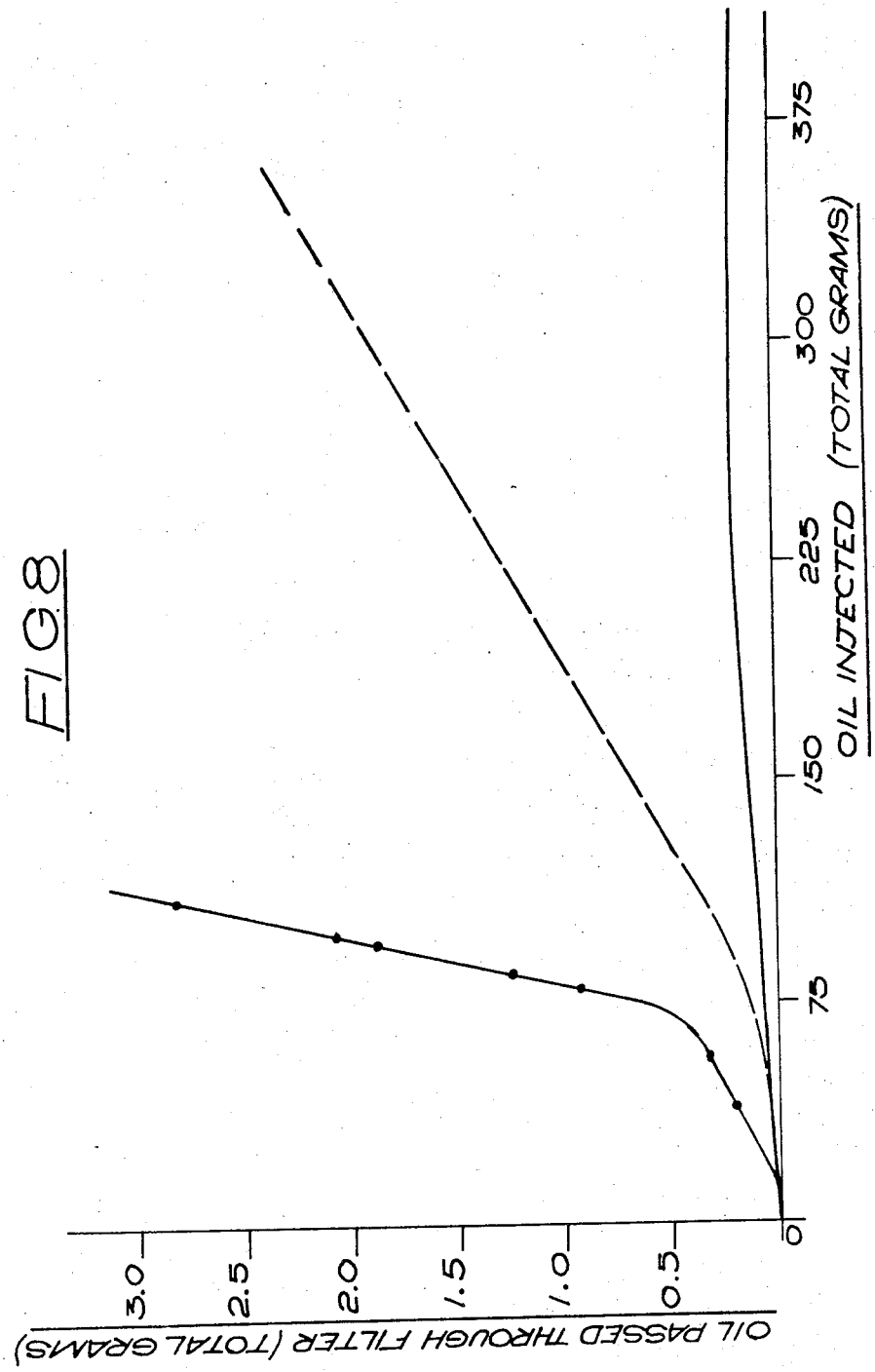
FIG. 8 is a graph showing the performance of the filter of FIG. 1 compared with other filters.

The filters comprise an outer support cylinder 10, an inner support cylinder 11 provided by a plastic impregnated wound paper ribbon element, an upper end cap 12 and lower end cap 13 provided with an inlet conduit 14. A filter medium body 21 of borosilicate fibers is compressed between the inner and outer supports and a porous sock 22 of plastic material surrounds the outer support 10.

The inner wound ribbon element 11 is itself microporous and presents operative pores with dimensions in the range of from 50 to 75 microns. The element 11 is covered by a filter medium body of borosilicate fibers at least 40 percent of which by weight have diameters in the range of from 0.09 to 0.2 microns. A cold curing epoxy resin sealant 15 having a viscosity of about 14 poises is poured into the end caps 12 and 13, the latter having an aperture 14 for the inlet of gas from a conduit connected to the end cap 13. The ends of the support members 10 and 11 and the end regions of the filter medium body 21 juxtaposed between them are submerged in the sealant in the end caps 12 and 13 respectively and the sealant allowed to cure.

In the embodiment shown in FIG. 1 a boundary layer 20 of filter cloth, of about 0.003 inches in thickness having an open weave with warps at 63 ends per inch and the fibers having diameters in the order of 0.0075 inches and a tensile strength of 130 pounds per square inch, is wrapped round the filter medium body 21 and compressed into intimate contact with it and against the inner surface of an outer support 10 of expanded metal having a flanged vertical joint, see FIG. 4, closed and secured by a slide on fastener 25 which embraces outwardly turned flanges 26 extending from top to bottom of the outer support 10.

In the embodiment shown in FIG. 5 an outer cylinder 10 of woven stainless steel wire presenting operative pores with dimensions in the range of from 50 to 75 microns is pressed into intimate contact with the filter medium body 21 and secured over the compressed filter medium body 21 by application of epoxy resin jointing compound 27 over overlapping parts of the wire mesh forming a joint 28 extending from top to bottom of the outer support 10.

In use contaminated gas such as air from a compressor tank is supplied through the apertures 14 in the lower end caps and passes outwardly, the liquid contaminant coalescing and dropping from the outer porous sock into a collecting chamber (not shown). The filter medium body is initially compressed so as to remain in intimate contact with the inner and outer support members without migration of fibers in use — the larger are the very small pores in or associated with the support members the greater is the compression required for predetermined operating conditions. Within the limits of the preferred pore sizes however this is not usually a critical consideration at least for operating with gas pressures up to about 150 pounds per square inch provided the compression applied to the filter medium body is in the order of 25–35 pounds per square inch.

The graph FIG. 8 was prepared from data obtained using three different filter assemblies respectively under identical conditions connected to an air line at 100 pounds per square inch gauge pressure; the atmospheric pressure was 12.2 pounds per square inch (barometer). The filter assembly was weighed and the noted amounts of lubricating oil in each case injected in increments of 50 grams on the inlet side of the filter assembly which was then reweighed and a further increment injected. The weight of oil passed through shown was obtained by subtracting the initial weight from the result noted from the next weighing prior to injection of a further increment of oil. The line shown in full was obtained from a filter element as described with reference to and as illustrated in FIG. 1; the broken line from a filter having a sintered bronze element of 3-micron rating sold and used with an identical-looking pre-filter; and the chain-dotted line from a textile filter having a 3-micron rated element consisting of cotton flannel wrapped upon a wire mesh screen core and retained by a similar wire mesh external support, the maximum operating temperature of this element being 250°F.

It will be seen that the sintered bronze filter elements performed for a longer period than the textile filter element before cleaning was required, whereas the textile element must be replaced sooner. The filter element according to FIG. 1 also must be replaced periodically, having a useful life of several times that of the textile element depending upon the amount of extraneous dirt in the gas, the filter element according to FIG. 1 slowly becoming more resistant to the passage of air before requiring replacement due to the drop in through the flow of air.

It is essential that the pore size of the inner or outer support core or the reinforcing boundary layer is such that it will prevent both rupture of the composite filter media as well as fiber migration. The size of fiber used in the filter media may be varied, together with the porosity of the core, for example in applications where it is desirable to employ a filter media made up of fibers of 0.08 to 0.2 microns, the porosity of the inner or outer support core or boundary layer is correspondingly varied being less porous than is the case where fibers having a greater diameter are employed. Filter media made from small fibers need to have a boundary layer or support core with a pore size of approximately 25 to 30 microns whereas the filter media made from fibers say from 0.1 to 0.5 microns in size have a support screen or boundary layer with a pore size nearer 75 to 150 microns. Tests should be carried out to ensure that the correct pore size for any given batch of filter media is employed. The rating figures 0.08 to 0.5 microns refers to the diameter and the length of fibers also varies correspondingly with the range of diameters.

We claim:

1. An elongated cylinder-shaped filter for the removal of impurities including minute particles from a compressed fluid comprising an inner fluid permeable support member consisting of a plastic impregnated wound paper ribbon element;

an outer fluid permeable support member made of a woven wire material, said inner fluid permeable support member being concentrically mounted within said outer fluid permeable support member, said inner and outer fluid permeable support member provided with operative pores with diameters in the range of from 50 to 75 microns for permitting passage of the fluid at an elevated pressure;

a body of fibrous fluid filter medium disposed between said inner and outer support members, said fibrous fluid filter medium having fibers distributed within, the distribution and dimensions of said fibers in said body of fibrous filter medium being adapted for the complete removal from the fluid of minute particles having dimensions in the range of 0.01 to 0.8 microns, said fibrous filter medium being free of cohesive material and being compressed by said inner and outer support members to prevent movement of said fibers at elevated pressure differentials, said fibrous filter medium comprises borosilicate fibers having diameters in the range of from 0.08 to 0.5 microns;

conduit means connected to said inner fluid permeable support member for communicating the fluid therein;

said fibrous filter medium being bounded by operational surfaces and having edge regions juxtaposed between said fluid permeable support members;

upper and lower end caps surrounding the ends of said fluid permeable support members, said lower end caps being apertured for communicating the fluid to said inner permeable support member;

a fluid impervious sealant provided for penetrating said edge regions of said fibrous filter medium and for forming a bond between said edge regions and said juxtaposed fluid permeable support members, said fluid impervious sealant securing said fluid permeable support members to said upper and lower end caps;

said inner fluid permeable support member being constructed to permit it to move toward said outer fluid permeable support member to compress said fibrous filter medium between said support members and having clamping means for maintaining the position of said inner fluid permeable support member relative to the outer fluid permeable support member for maintaining the compression of said fibrous filter medium;

one of said fluid permeable support having an inner boundary layer, said boundary layer having a thickness of approximately 0.003 inches and being in intimate contact with the operational surface of said fibrous filter medium from which the fluid passes; and a porous outer sock being of a plastic material and covering said outer fluid permeable support member for receiving the liquid impurities coalesced by the non-absorbent fibers of said filter medium.

2. An elongated cylindrical-shaped filter, according to claim 1, wherein said fluid permeable support having an inner boundary layer is the outer fluid permeable support.

* * * * *